US007365331B2

(12) United States Patent
Moulin et al.

(10) Patent No.: US 7,365,331 B2
(45) Date of Patent: Apr. 29, 2008

(54) METHOD OF DETECTING A PRINTABLE SURFACE

(75) Inventors: Olivier Moulin, Ville d'Avray (FR); Olivier Desprez, Versailles (FR); Christophe Caillon, Bretigny (FR)

(73) Assignee: Solystic, Gentilly (FR)

( * ) Notice: Subject to any disclaimer, the term of this patent is extended or adjusted under 35 U.S.C. 154(b) by 748 days.

(21) Appl. No.: 10/511,395

(22) PCT Filed: Jul. 21, 2004

(86) PCT No.: PCT/FR2004/050346

§ 371 (c)(1),
(2), (4) Date: Oct. 15, 2004

(87) PCT Pub. No.: WO2005/039786

PCT Pub. Date: May 6, 2005

(65) Prior Publication Data

US 2005/0278064 A1 Dec. 15, 2005

(30) Foreign Application Priority Data

Oct. 23, 2003 (FR) .................................. 03 50725

(51) Int. Cl.
*G01J 5/02* (2006.01)

(52) U.S. Cl. .................................................. 250/341.8

(58) Field of Classification Search ............. 250/341.8
See application file for complete search history.

(56) References Cited

U.S. PATENT DOCUMENTS

| | | | | |
|---|---|---|---|---|
| 3,933,094 | A * | 1/1976 | Murphy et al. | 283/88 |
| 5,157,253 | A | 10/1992 | Strohmeyer | |
| 2003/0044189 | A1* | 3/2003 | Okitsu et al. | 399/45 |
| 2004/0084631 | A1* | 5/2004 | Spoonhower et al. | 250/474.1 |

FOREIGN PATENT DOCUMENTS

| | | | |
|---|---|---|---|
| EP | 0 930 106 | A | 7/1999 |
| EP | 1 048 363 | A | 11/2000 |

* cited by examiner

*Primary Examiner*—Dave Porta
*Assistant Examiner*—Mindy Vu
(74) *Attorney, Agent, or Firm*—Sughrue Mion, PLLC

(57) ABSTRACT

A method of processing postal articles in which a physical magnitude is measured in order to detect (2) whether the outside surface of a postal article is made of a plastics material, and in which a digital image of said outside surface of the postal article is processed in order to detect (3) whether said surface has a noisy background. On the basis of the results of these two detection operations, it is determined (4) whether the outside surface of said postal article is a printable surface or a non-printable surface.

6 Claims, 2 Drawing Sheets

METHOD OF DETECTING A PRINTABLE SURFACE

The invention relates to a method of processing articles, in particular postal articles, each having an outside surface that is suitable for receiving a label on which information can be printed if said outside surface is not itself a printable surface, in which method a physical magnitude is measured for each article in order to detect whether the outside surface of said article is made of a plastics material.

Certain postal sorting applications require bar codes, for example, to be printed on the outside surfaces of postal articles. It can happen that sorting machines sometimes need to process envelopes made of plastics material and envelopes made of paper. There then arises the problem of printing bar codes on the outside surfaces of envelopes made of plastics material, since on that kind of medium, ink takes a long time to dry and a printed bar code is liable to be removed by the envelopes rubbing against parts of the sorting machine.

Several techniques are already known for detecting postal articles having an outside surface made of plastics material.

One known technique is detection by reflection which consists in illuminating the outside surface of the article and in measuring the light flux it reflects. Plastics material has an index of reflection that is greater than that of paper, so detection is simple to implement. Nevertheless, that technique can be ineffective when an article made of plastics material have an outside surface that is mat or colored, i.e. when it has an index of reflection that is close to that of paper.

Another technique that is known from patent FR 2 727 330 relies on a pneumatic principle which consists in deforming the article for inspection by suction and in measuring the pressure variation associated with said deformation. The outside surface of an article in a plastics envelope is generally less rigid than the outside surface of an article in a paper envelope, so detection is simple to implement. Nevertheless, the effectiveness of that technique is very sensitive to dust and requires the pressure sensor to be cleaned frequently in order to maintain a satisfactory level of precision in measurement.

Another technique described in the patent application published under the number WO 01/76775 relies on an acoustic principle which consists in establishing suction in front of the postal article and in comparing the acoustic signal that results from the suction effect with a reference signal. It turns out that the signals do not differ sufficiently depending on the material, so the results that are obtained with that technique (85% to 95% correct decisions) are not yet sufficient.

In general, the methods presently in use for detecting a plastics surface present insufficient reliability, which leads to a pointless increase in the consumption of labels. Furthermore, paper envelopes can have a surface that is too noisy to receive printing of a bar code, since the bar code is subsequently illegible to the machine.

The object of the invention is to remedy the drawbacks set out above by proposing a method for detecting all types of postal article having an outside surface that is not printable, i.e. an outside surface that is made of plastics material or that is noisy, thereby optimizing the process of applying labels onto the envelopes of postal articles. Another object of the invention is to propose such a method that is simple to install in a postal sorting machine.

To this end, the invention provides a method of processing postal articles, each having an outside surface suitable for receiving a label onto which information can be printed if the outside surface is not itself a printable surface, in which method, a physical magnitude is measured for each postal article in order to detect whether the outside surface of said postal article is made of a plastics material, the method being characterized in that it further consists in forming a digital image of said outside surface of the article, in performing processing on the digital image in order to detect whether the outside surface of the article has a noisy background, and on the basis of the results of both kinds of detection, in determining whether the outside surface of said article is a printable surface or a non-printable surface.

The method of the invention further presents the following features:

- the method of detecting a surface made of plastics material consists in moving each article past a reflection detector having one or more calibrated emitting and receiving photocells;
- the reflection detector is a brightness detector emitting and receiving radiation in the infrared range;
- use is made of a multiple gray level digital image of the outside surface of the article in order to detect whether said outside surface is a surface with a noisy background; and/or
- the results of the two detection operations are combined by means of a logical OR in order to determine whether said article has a surface that is printable or a surface that is not printable.

The invention extends to a machine for sorting postal articles and including an automatic address-recognition module, the machine being characterized in that it is adapted to implement a method as defined above, with detection of a noisy background being performed in the automatic address-recognition module.

The principle of the invention can be applied to machines other than postal sorting machines, whenever symbols need to be printed on a variety of media, including both paper and plastics materials (when the term "plastics material" covers any reflecting surface that lacks pores for receiving printing, for example aluminum-plated envelopes or other envelopes used for so-called "express" mail), the printing being for subsequent machine reading with very high reliability. As non-limiting examples, the invention applies to printing information on the outside surfaces of parcels, which information may relate to an address or to a particular delivery service.

It has been found that the use of infrared radiation for measuring brightness gives results that are satisfactory for detecting surfaces made of plastics materials. Furthermore, it has been found that the use of a digital image with multiple gray levels provides results that are satisfactory, even at moderate levels of contrast. Combining those two methods of detecting a non-printable surface makes it possible to obtain a good detection rate of about 98%.

An implementation of the method of the invention is described below in greater detail and is represented by the accompanying drawings which are provided as non-limiting examples.

Figure 1:
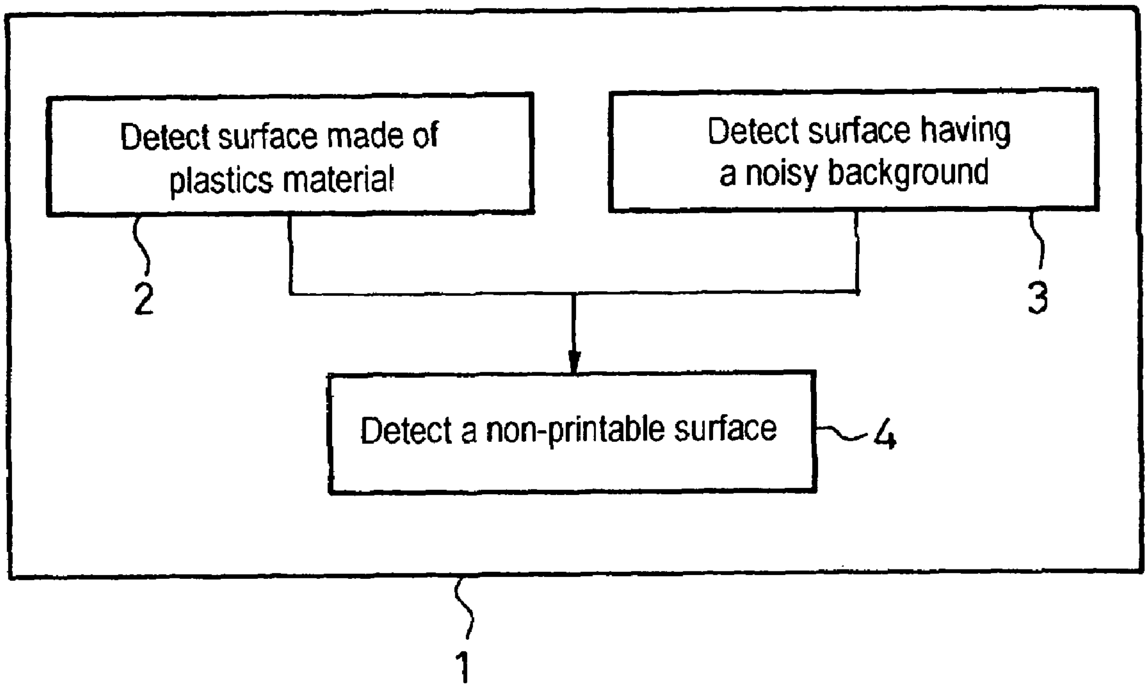
FIG. 1 is a very general block diagram showing the method of the invention.

FIG. 1 shows, in very general manner, the two processing steps of the method of the invention that are implemented in this case in a machine for processing postal articles, in particular in a postal sorting machine symbolized by rectangle 1, the method serving to distinguish between postal articles having an outside surface that is printable and postal articles having an outside surface that is not printable, in which case a sticky label needs to be applied to the outside surface.

An outside surface is said to be "printable" when symbols (letters, digits, bar codes, . . . ) can be applied thereto, for example by a printing machine of the ink jet printer type, the laser printer type, etc., and on which it is possible subsequently to perform automatic recognition of those symbols by machine.

The two processing steps in the method of the invention are firstly a processing step 2 which consists in measuring a physical magnitude in order to detect whether the outside surface of a postal article is made of a plastics material, and secondly a processing step 3 which consists in processing data in the digital image of the outside surface of said postal article in order to determine, on the basis of said digital image, whether said outside surface of the postal article has a noisy background. In the invention, the detection results of those two processing steps 2 and 3 are combined in a step 4 in order to determine whether the outside surface of a postal article is a surface that is printable or not printable.

Figure 2:
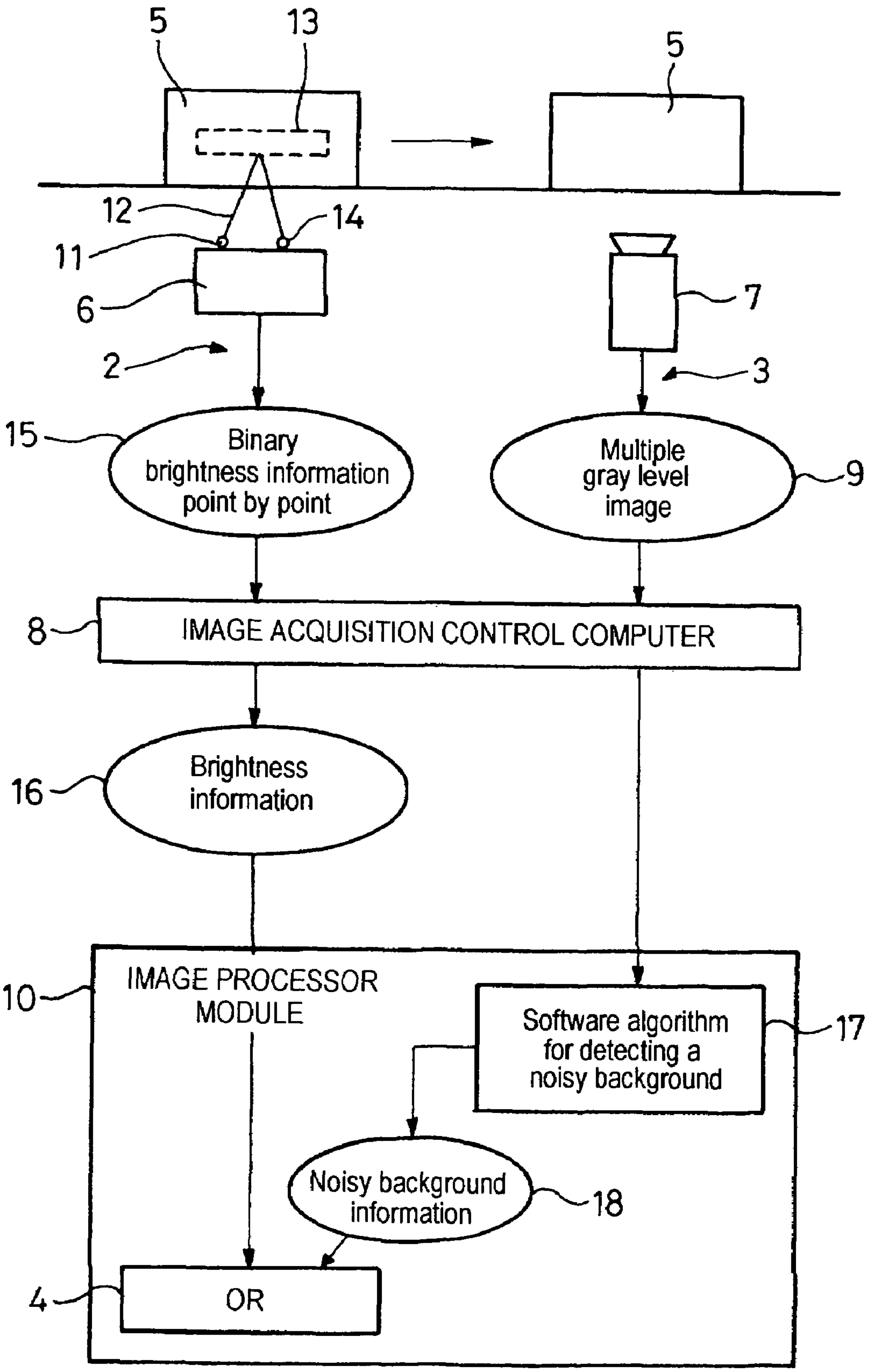
FIG. 2 is a more detailed block diagram showing the method of the invention.

FIG. 2 shows an implementation of the method of the invention in greater detail, in which it is detected whether the outside surface of a postal article is made of plastics material on the basis of measuring brightness, and in which it is determined whether the postal article has an outside surface that is noisy on the basis of processing a digital image of said outside surface, where the image has multiple gray levels.

Postal articles referenced 5 are moved one by one through a postal sorting machine 1, firstly past a brightness sensor 6, and then past an image acquisition unit 7, e.g. a charge-coupled device (CCD) camera.

It should be understood that the method of the invention can easily be implemented in a conventional postal sorting machine in which the image acquisition unit 7 forms part of an automatic address-recognition device (using optical character recognition (OCR) and video encoding) and further including a computer 8 for controlling image acquisition and that receives the digital images from the image acquisition unit 7 for onward transmission to an image processing module. The image acquisition unit 7 provides a digital image 9 of the outside surface of the postal article 5, which image has multiple gray levels.

For automatic address recognition, the digital image 9 is normally sent for OCR processing in an image processing processor (module) 10 that presents a high level of computer power.

The brightness sensor 6 is made up of one or more calibrated emitting photocells 11 operating in the infrared range and delivering infrared radiation 12 to scan a zone 13 of the outside surface of the postal article 5 that is to receive machine-printed symbols, such as a bar code, together with one or more calibrated receiving photocells such as 14 which measure the intensity reflected from all of the points in the zone 13, in order to compare the intensity measured at each point with a threshold a value that is adjusted while calibrating the photocells 11 and 14. In particular, it is possible to use a brightness sensor 16 of the "PI-G" series sold by the supplier "Keyence". The receiving photocell 14 delivers binary information indicative of the intensity level of each point under consideration in a series of samples located on a horizontal line extending right across the article and situated halfway up the zone 13. The brightness sensor 6 delivers a series of bits providing binary information 15 concerning the point-by-point brightness of each point in the zone 13 to the computer 8 for controlling image acquisition, which computer integrates the point-by-point binary brightness information 15 over the entire zone 13 and decides whether the brightness information 16 is indicative either of the postal article 5 being considered as having an outside surface that is made of plastics material and that is therefore not printable, or else of the postal article 5 being considered as having an outside surface that is not made of plastics material. This brightness information 16 is subsequently forwarded to the image processor module 10.

In order to implement the method of the invention, the multiple gray level image 9 supplied at the output from the image acquisition unit 7 is applied to the image processor module 10. As described in greater detail below, the image processor module 10 is designed to use a software algorithm 17 for detecting a noisy background by detecting in said multiple gray level image 9 whether the background noise 18 in the image exceeds a certain threshold, and if it does, for determining that the outside surface of the article is a non-printable surface. A decision function 14 of the image processor module 10 responds to the brightness information 16 and to the noisy background information 18 to decide whether the postal article 5 is a postal article having a non-printable outside surface. The decision 4 can be made by means of a logic OR operation, i.e. a label is applied to the postal article 5 providing at least one of the two detection steps 2 and 3 classifies the postal article 5 as having an outside surface that is not printable.

The software algorithm 17 for detecting a noisy background serves to assess the uniformity and the brightness of the zone 13. The background is considered as being increasingly noisy for high levels of contrast and for low levels of brightness. For this purpose, the multiple gray level image 9 is sampled by means of pixel segments, which segments extend in four directions, horizontal, vertical, and diagonal directions. For each segment, the mean IM of pixel intensities and the mean $M_{tot}$ of the squares of the pixel intensities are calculated in order to obtain the uniformity rating TH of the segment, indicative of contrast over the segment, on the basis of the following relationships:

$$\text{if } IM>0 : TH=IM^2/E_{tot}$$

$$\text{else } TH=1.$$

However, the uniformity rating cannot distinguish between two uniform segments of different mean intensities. It is therefore necessary to weight the measurement of uniformity as a function of the mean intensity of the segment. The theoretical intensity $I_{bar\text{-}code}$ of a printed bar code is known, as are the intensities of a white pixel and of a black pixel which have the following values respectively: 255; and 0. A weighting coefficient k is then deduced on the basis of the following relationships:

$$\text{if } IM<I_{bar\_code}\text{: } k=0$$

$$\text{else } k=(IM-I_{bar\_code})/(255-I_{bar\_code})$$

Thus, the noise index IB over a segment has a value lying in the range 0 (not noisy) to 100 (noisy), given by:

$$IB=100*(1-k*TH)$$

In order to decide on the status of the background, the mean and the standard deviation of the noise indices for all of the image segments are examined and compared with threshold values.

The algorithm described above by way of example relates to detecting a noisy background onto which a code is to be applied using black ink. That is why it is considered that the noise of the background increases with increasing contrast and with decreasing brightness. This criterion needs to be modified when printing a bar code using a fluorescent ink, for example, since such a bar code is much more sensitive to the color of the background than to its intensity.

A noisy background can be detected 3 much more finely from a multiple gray level image 9 than from a binary image, and it is possible to perform such detection nowadays because of the power and computation speed of present-day computers. More moderate levels of contrast can be detected and luminance information about the article can be accessed, thereby improving the performance of the method and making it possible in particular to detect surfaces that are dark with little contrast.

Detection by brightness 2 is detection by reflection, but by using radiation in the infrared range it presents better reliability, since the difference between reflection on paper and on plastics material is greater at such wavelengths than for radiation in the visible range.

It is easy to integrate the method of the invention in a postal sorting machine 1, since only the brightness sensor 6 needs to be integrated in the machine, and such a brightness sensor 6 is inexpensive and of a size that is smaller than one cubic decimeter. The only maintenance operation required during operation of the postal sorting machine is rapid de-dusting of the brightness sensor 6.

The combination of these two techniques, i.e. detecting brightness 2 and detecting a noisy background from a multiple gray level image 3, is particularly advantageous since it gives a very good detection rate for articles having outside surfaces that are not printable, of the order of 98%. These two detection techniques are complementary since detecting brightness in order to recognize surfaces made of plastics materials has difficulty in detecting plastics material surfaces that are mat or colored, but such plastics material surfaces that are mat or colored are detected by detecting the noisy background in the multiple gray level image.

It is also possible to detect the plastics material surface by a technique relying on pneumatic detection, acoustic detection, or electrostatic detection. Electrostatic detection can consist in charging the outside surface of a postal article by means of an electrifying member, and subsequently measuring the residual electrostatic charge for comparison with a reference value.

The invention claimed is:

1. A method of processing postal articles, each having an outside surface suitable for receiving a label onto which information can be printed if the outside surface is not itself a printable surface, in which method, a physical magnitude is measured for each postal article in order to detect (2) whether the outside surface of said postal article (5) is made of a plastics material, the method being characterized in that it further consists in forming a digital image of said outside surface of the article, in performing processing on the digital image in order to detect (2) whether the outside surface of the article has a noisy background, and on the basis of the results of both kinds of detection, in determining whether the outside surface of said article is a printable surface or a non-printable surface.

2. A method according to claim 1, in which the method (2) of detecting a surface made of plastics material consists in moving each article (5) past a reflection detector (6) having one or more calibrated emitting and receiving photocells (11, 14).

3. A method according to claim 2, in which the reflection detector (6) is a brightness detector emitting and receiving radiation (12) in the infrared range.

4. A method according to claim 1, in which use is made of a multiple gray level digital image (9) of the outside surface of the article in order to detect whether said outside surface is a surface with a noisy background.

5. A method according to claim 1, in which the results of the two detection operations (2, 3) are combined by means of a logical OR in order to determine whether said article has a surface that is printable or surface that is not printable.

6. A machine (1) for sorting postal articles, which machine includes an automatic address-recognition module, the machine being characterized in that it is adapted to implement the method according to claim 1, with detection of a noisy background being performed in the automatic address-recognition module.

* * * * *